United States Patent
Babinski

[19]

[11] Patent Number: 5,943,910
[45] Date of Patent: Aug. 31, 1999

[54] TELESCOPIC BALL NUT AND SCREW LINEAR ACTUATOR AND METHOD OF CONSTUCTING AND USING IT

[75] Inventor: James A. Babinski, Saginaw, Mich.

[73] Assignee: Thomson Saginaw Ball Screw Company, L.L.C., Saginaw, Mich.

[21] Appl. No.: 08/884,611

[22] Filed: Jun. 30, 1997

Related U.S. Application Data

[60] Provisional application No. 60/027,045, Oct. 4, 1996.

[51] Int. Cl.⁶ .................................................. F16H 25/22
[52] U.S. Cl. .................................... 74/89.15; 74/424.8 B; 74/424.8 R
[58] Field of Search ............................. 74/424.8 B, 459, 74/89.15, 424.8 R; 254/102

[56] References Cited

U.S. PATENT DOCUMENTS

| | | | |
|---|---|---|---|
| 1,635,397 | 7/1927 | Burkholder | 254/102 |
| 1,741,793 | 12/1929 | Runyan | 254/102 |
| 3,029,660 | 4/1962 | Sears | 74/424.8 B |
| 3,314,655 | 4/1967 | Steele | 254/102 |
| 3,762,227 | 10/1973 | Bohnhoff | 74/89.15 |
| 4,295,384 | 10/1981 | Brandt et al. | 74/89.15 |
| 4,732,365 | 3/1988 | Kloster | 254/102 |
| 5,002,172 | 3/1991 | Stringer | 74/424.8 B |

*Primary Examiner*—Tamara L. Graysay
*Assistant Examiner*—William C Joyce
*Attorney, Agent, or Firm*—Reising, Ethington, Barnes, Kisselle, Learman & McCulloch, P.C.

[57] ABSTRACT

A telescopic multiple ball screw nut linear actuator has an outer screw and first nut defining a first helical ball raceway between them. The screw has a tubular portion with an axially open outer end on which a second nut is fixed. An inner screw, providing with the second nut a second helical ball raceway of opposite hand, is received within the outer screw tubular portion and is projectable from its open outer end, and a non-helically grooved, plug end fitting the inner diameter of the tubular portion of the outer screw is provided on the axially inner end of the inner screw and coacts with the tubular portion of the outer screw, with only an operating clearance therebetween, to restrain whipping when the inner screw is in projected position. The plug in one position relative to the second nut establishes the limit of projection of the inner screw by blocking the travel of the balls in the second raceway from the second nut to the inner screw.

15 Claims, 3 Drawing Sheets

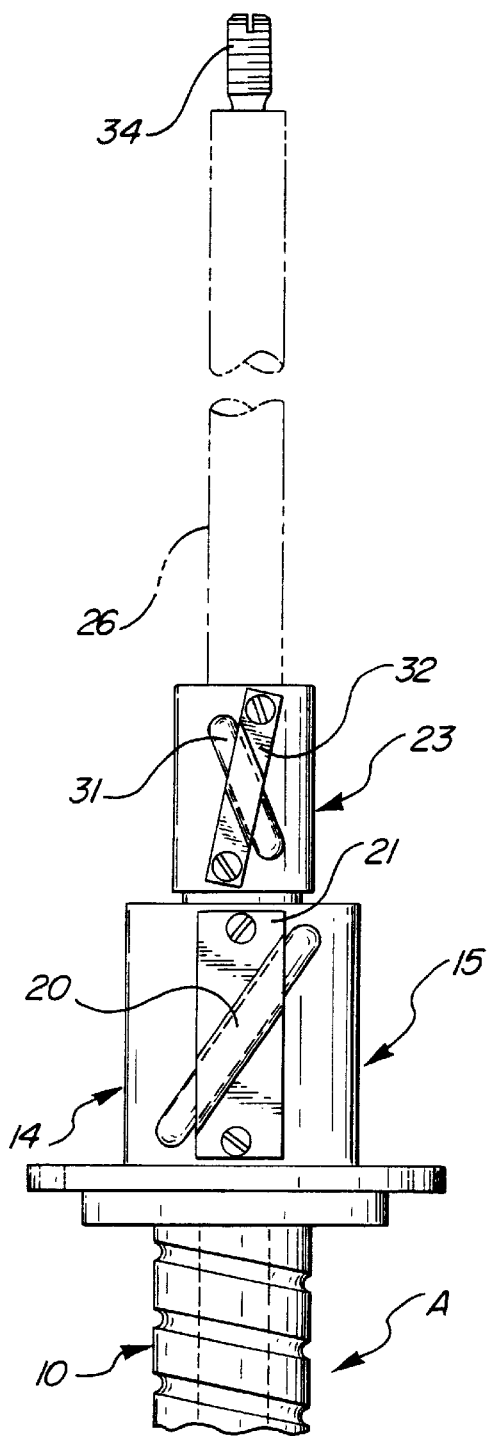
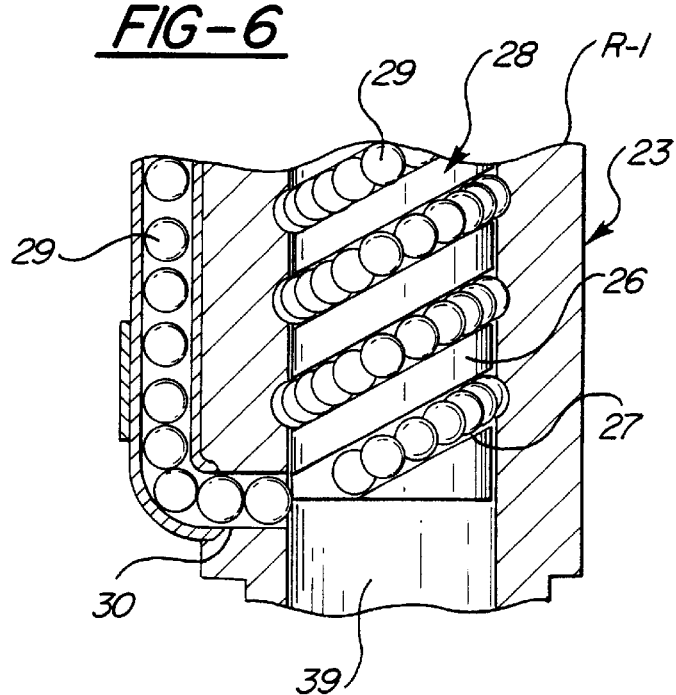

5,943,910

TELESCOPIC BALL NUT AND SCREW LINEAR ACTUATOR AND METHOD OF CONSTUCTING AND USING IT

The application claims the priority of provisional application Ser. No. 60/027,045 filed Oct. 4, 1996.

This invention relates to improvements in extensible ball nut and screw assemblies and more particularly to an assembly wherein it is necessary to produce a large actuator stroke with an assembly of limited retracted length.

BACKGROUND OF THE INVENTION

In many applications, such as the aircraft industry, for example, it is necessary to utilize high speed linear actuators which can produce large operating strokes with actuators which are of limited overall length in their retracted position because of space limitations.

Typically, such assemblies are used in vertical disposition and must be capable of operating at speeds in the neighborhood of several thousand revolutions per minute. At speeds such as this, with telescoping screw assemblies wherein one screw is accommodated within a bore in another screw, the extension screw which couples to the part to be actuated tends, when extended, to whip or wobble with the result that a vibration occurs which creates not only rapid wear and degradation of the parts, but also considerable undesirable noise.

SUMMARY OF THE INVENTION

The present improvement invention is concerned with the provision of a dual function slide plug of limited axial length secured on the end of an inner screw in the telescoping column which has a diameter slightly larger than the external diameter of the lands of the inner screw and moves within the bore of the outer screw with a sliding tolerance. This plug end not only has the capability of damping the vibration and noise by greatly ameliorating the wobbling which otherwise occurs, it also acts as a safety stop in both extend and retract modes. In the extension mode of the inner screw, it functions as a wall at full extension to prevent the recirculation of balls in the ball nut with which it is associated, while in the retract mode it bottoms into the bore provided for it in the outer screw.

One of the prime objects of the present invention is to provide a high speed linear actuator of the character described which greatly minimizes vibration occurring because of the high speed rotation of an assembly whose free extended actuator end is restrained from whipping only by the ball nut with which it is associated.

Another object of the invention is to provide a telescopic ball screw and ball nut linear actuator incorporating the slide plug of the invention which further acts as a safety stop in both extend and retract modes to prevent overtravel.

Still another object of the invention is to provide an assembly of the character described which adds rigidity to the system, particularly when a side load is applied.

Another object of the invention is to provide a telescopic ball nut and screw assembly which lengthens the operating life of telescopic linear actuators by improving the alignment and concentricity of the ball screw shafts as wear or lash increases over the life use of the unit, while at the same time minimizing wear and degradation of the assembly and correcting for the misalignment of attachments which might tend to provide undesirable offset loads.

Still another object of the invention is to provide an assembly employing the present inventive concepts to increase the efficiency of the telescopic apparatus, utilizing a slide plug as disclosed which assists in retaining lubricant for the inner screw.

Still another object of the invention is to provide a relatively inexpensive, highly durable device which permits the higher speed rotation of such actuators.

These and other objects, advantages and features of the present invention will become more apparent from the following detailed description when taken together with the accompanying drawings wherein:

THE DRAWINGS

The presently preferred embodiment of the invention is disclosed in the following description and in the accompanying drawings, wherein:

FIG. 4 is a partly schematic fragmentary elevational view showing the inner screw in its extended position;

FIG. 6 is an enlarged fragmentary, sectional, elevational view showing the inner screw approaching fully extended position.

COMPREHENSIVE DESCRIPTION OF THE DRAWINGS

Figure 1:
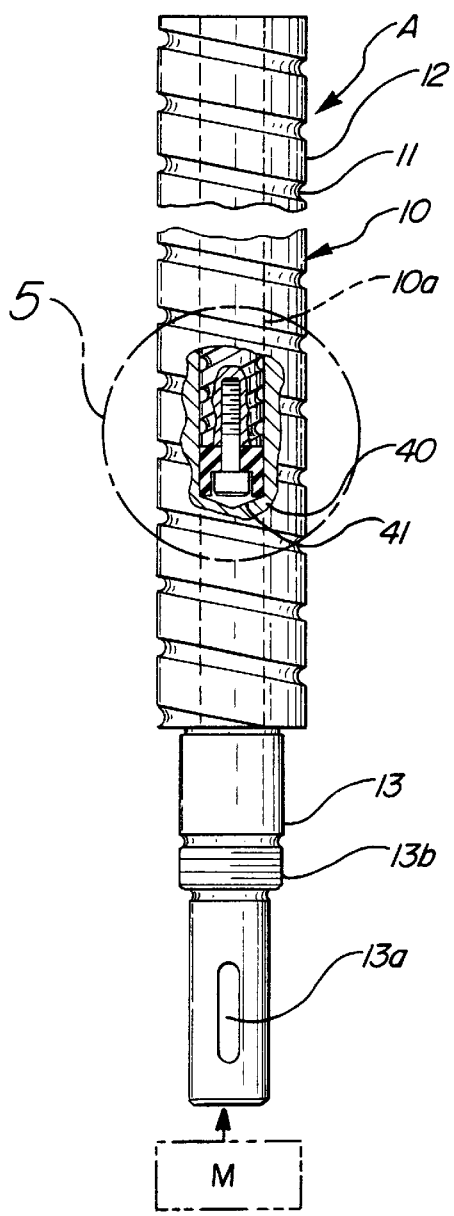
FIG. 1 is a partly schematic sectional, fragmentary elevational view of the linear actuator screw configuration.

Referring now more particularly to the accompany drawings, and in the first instance to FIG. 1 thereof, an actuator or actuator device or assembly, generally designated A, is disclosed as having an outer screw member or screw 10, provided with a helical groove 11 and a helical land 12, fixedly coupled to a drive shaft 13 having a key-way 13a by means of which it can be coupled to a drive assembly, schematically indicated at M, including, for example, an electric motor and a suitable gear box. In addition to keyway 13a, the shaft 13 at its terminal end may have flatted sides to serve as a safety backup for key way 13a.

It is to be understood that the shaft 10 is not prevented from moving axially and a threaded portion 13b may be provided on the shaft 13 for purposes of securing a bearing or the like which journals rotation of the shaft 13 while permitting its axial movement. At its upper end, the screw 10 coacts with a ball device or nut, generally designated 14, which is prevented from rotating and from shifting axially. The screw 10 moves axially dependent upon the direction of rotation of the screw 10 under the operation of the reversible motor assembly M, which can be mounted on an axial slide member. The nut device 14 includes a nut 15, with complemental helical groove and land portions 16 and 17, respectively, which cooperate with the screw groove and land portions 11 and 12 to provide a helical raceway, generally designated R, for the reception of a train of recirculating abutting load bearing balls 18. Radial ball passages 19 in the nut 15 receive and connect with an external ball return tube 20 in the usual manner, and a strap 21 may be secured in position to anchor the return tube 20 to the nut 15. As FIG. 3 indicates, the nut 15 is flanged and openings 22 may be provided to permit bolts to anchor the device 14 to a member which prevents the device 14 from rotating with the screw 10, and from moving axially.

Figure 3:
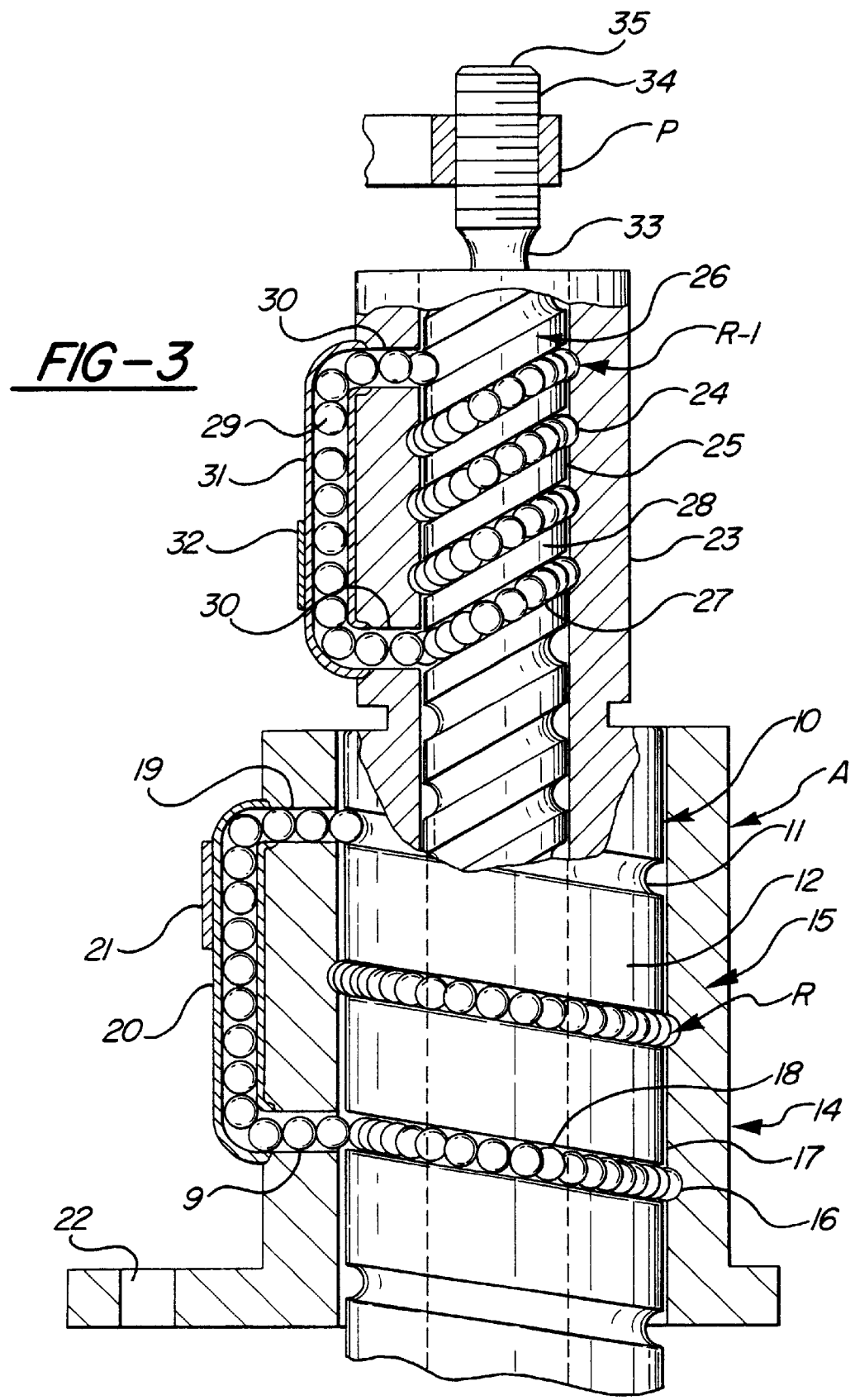
FIG. 3 is an enlarged, fragmentary view taken on the line 3—3 of FIG. 2.

As FIG. 3 further indicates, rigidly coupled to the screw 10 is a smaller diameter nut or nut device 23, which incorporates a helical groove 24 and a helical land 25, and coacts with an inner smaller diameter screw 26, having a helical groove 27 and helical land 28, which is slidably carried in a bore or inner screw chamber 10a provided in screw 10. The complemental grooves or groove portions 24 and 27 form a raceway, generally designated R-1, which receives a train of recirculating load-bearing balls 29 in the usual manner. Radial ball ports 30 provided in the nut 23 receive and connect with an external ball return tube 31, which may be secured in place by a suitable strap 32.

At its outer end, inner screw 26 is reduced in diameter, as at 33, and has a threaded portion 34 provided with a screwdriver receiving slot 35. It is this outer end which attaches to the part P to be operated via threads 34. It may be characterized as the free end because in extended position it cantilevers out beyond the nut 23.

Figure 5:
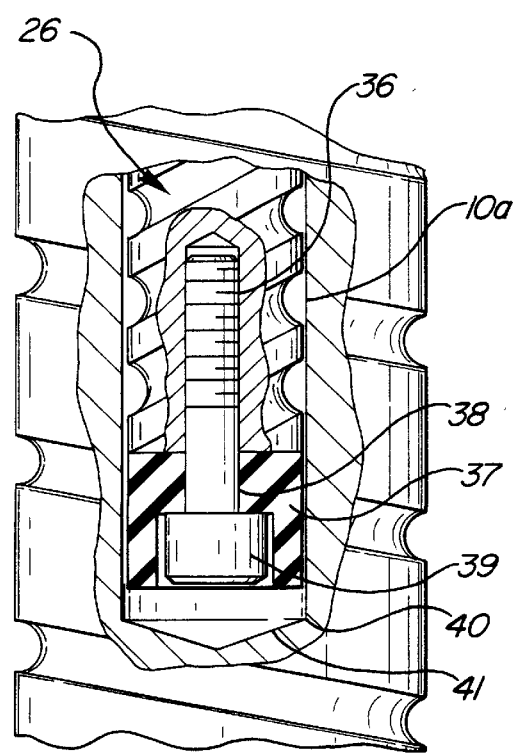
FIG. 5 is a greatly enlarged, fragmentary, sectional, elevational view of the area identified as area 5 in FIG. 1.

Referring now particularly to FIG. 5, it will be seen that the inner screw 26 is provided with a threaded bore 36 at its inner end to permit the mounting of a slide plug or end plug 37 which has a sliding clearance in the elongate concentric passage or chamber 10a provided within outer screw 10 for the inner screw 26. As shown in FIG. 5, the slide plug 37, which may be constructed of nylon, or another long wearing, vibration absorbing material, has a counterbored opening 38 to accommodated the cap screw 39 which secures the member 37 to the inner end of the screw 26. It is important to observe that the cylindrical non-grooved slide plug member 37 is of greater diameter than the diameter of the screw land 25 and has only a sliding clearance with respect to bore 10a. Typically, there will be a differential of several thousands of an inch between the diameter of the screw land 28 and the diameter of the slide plug 37. In a typical installation, the ball circle diameter of screw 10 may be 1.150 inches with balls of a diameter of 0.125 inches and the ball screw diameter of screw 26 may be 0.625 inches with similar balls. The screws 10 and 26 and raceways R and R-1 are of opposite hand and the screw threads or lands of both screws 10 and 26 may have a lead of 0.5 inches.

THE OPERATION

Figure 2:
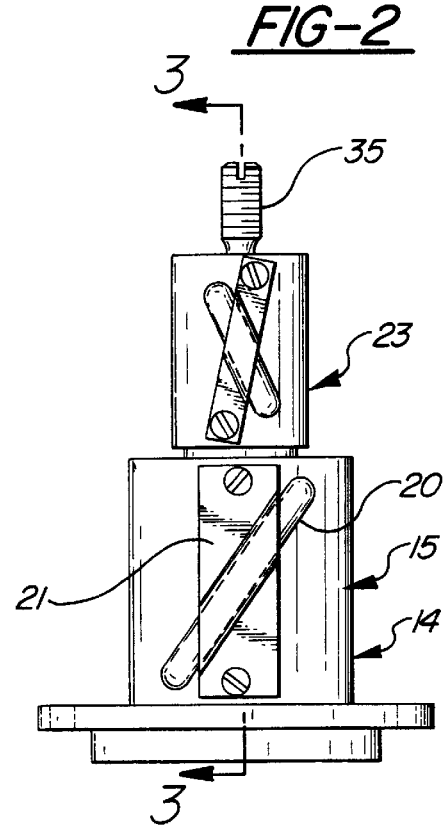
FIGS. 2 is a fragmentary, external, elevational view of the nut assembly in the retract mode.

The retracted position of the screws 10 and 26 is illustrated in FIGS. 1, 2, and 3, wherein slide plug 37 is shown engaged with the terminal edge 40 of the conically shaped surface 41 or lateral marginal wall of the inner screw chamber and provides a positive stop for screw 26 to avoid an overtravel which would be undesirable for safety reasons. When the inner screw 26 is in its extended position, the slide plug 37 is in a blocking position with respect to balls 29, as shown in FIG. 6, to prevent their recirculation and so functions as an overtravel stop in the opposite direction.

Assuming the apparatus to be in the FIG. 3 position, the rotation of screw 10 in a forwarding direction will cause it to travel axially upwardly with respect to the fixed nut device 14. At the same time, because nut 23 is fixed to screw 10 and rotates with it, and because screw shaft 26 is held from rotating by part P, the opposite hand screw 26 will be caused by the balls 29 of opposite hand nut 23 to travel axially upwardly with respect to screw 10 and nut 23.

For example, if screw 10 moves upwardly one half an inch, the inner screw 26 will move with it, and, at the same time, will extend one half an inch relative to screw 10, for a net travel of one inch for part P. When the apparatus reaches the end of its extensory travel, the screw 10 may have traveled 12.7 inches and the inner screw 26 will have extended 12.7 inches from screw 10.

The purpose of the screw driver slot 35 is to adjust the inner screw position axially to fine tune the start position of the inner screw 26 relative to the extended actuator part P. Part P could be a pivotally mounted lever, for example, or a slide of some kind.

The disclosed embodiments are representative of presently preferred forms of the invention, but are intended to be illustrative rather than definitive thereof. The invention is defined in the following appended claims.

I claim:

1. A ball nut linear actuator with multiple telescoping screws having a rotatable outer screw and first nut defining a first helical raceway between them in which a load bearing recirculating first train of balls is received, the outer screw having a tubular portion with an inner diameter and axially open outer end on which a second nut is fixed; a rotationally restrained inner screw, providing with said second nut a second helical raceway of opposite hand with respect to said first raceway, received within said outer screw tubular portion and projectable from said open outer end thereof, said inner screw having an axially inner end, and the second raceway including a generally radial ball passage in said second nut communicating with said inner screw, and having a load bearing second recirculating train of balls, includes the improvement wherein:

a. a non-helically grooved, cylindrical plug end fitting the inner diameter of said tubular portion of said outer screw is provided on said axially inner end of said inner screw and coacts with said inner wall of said tubular portion of said outer screw to restrain whipping when said inner screw is in projected position; and b. said plug end in one position relative to said second nut establishing a limit of projection of said inner screw out of said outer screw by reaching an axial projection radially opposite said second raceway passage and blocking the travel of said second train of balls in said second raceway passage; said plug end defining a non-inclined surface with an axle of rotation of said inner screw for engaging and blocking said second train of balls from traveling along said second raceway passage.

2. The invention of claim 1 wherein said tubular portion of said outer screw has an inner end and said plug end in a second position bottoms on said inner end of said tubular portion of said first screw.

3. The invention of claim 1 wherein said first nut is both axially and rotatably restrained, and said inner screw has an outer end adapted to be connected to a load to be moved.

4. The invention of claim 3 wherein a drive is applied to rotate said outer screw which moves said outer screw and said inner screw axially together and simultaneously projects said inner screw from said outer screw to increase the stroke of said actuator.

5. The invention of claim 4 including an attached load connecting number which restrains rotation of the inner screw.

6. The invention of claim 1 wherein said inner screw has a helical groove bounded by a helical land and said plug end is formed of a synthetic plastic material and is of slightly greater diameter than said land of the inner screw.

7. A method of constructing an improved ball nut linear actuator device with multiple telescoping screws having a rotatable outer screw and a first nut defining a first helical raceway between them in which a load bearing first recirculating train of balls is received, the outer screw having a tubular portion with an axially open outer end defining an inner screw chamber with a cylindrical wall and an inner end; a second nut fixed on the axially outer end of said outer screw; a rotationally restrained inner screw, providing with said second nut a second helical raceway of opposite hand in which a second load-bearing recirculating train of balls is received, positioned within said screw tubular portion and projectable from said open outer end, comprises the steps of:

a. providing said rotatable outer screw, having said tubular portion with said axially open outer end defining said inner screw chamber with said interior cylindrical wall and said inner end, and inserting said outer screw through said first nut;

b. providing said second nut fixed on the outer end of said outer screw;

c. providing said inner screw to be radially received by and coact with said second nut and adapted to fit within said chamber;

d. providing a non-ball-accommodating, axially extending, axially inner cylindrical plug end of greater diameter than said inner screw and defining a non-inclined surface with an axis of rotation of said inner screw on said inner screw fitting the diameter of said cylindrical wall of said inner screw chamber to restrain inner screw whipping;

e. inserting said inner screw through said second nut into said inner screw chamber;

f. restraining said inner screw frozen moving axially; and g. positioning said inner screw and said second nut relatively axially so that movement of said inner screw axially is halted when said non-inclined surface of said plug end comes into radial alignment with and blocks travel of said second train of balls in said second helical raceway.

8. The method of claim 7 including the step of relatively axially locating said second nut and said inner screw so that said plug end positively blocks the flow of said second train of balls in said second raceway between said second nut and said inner screw to establish the extent of projection of said inner screw from said outer screw.

9. The method of claim 7 including the step of arranging the length of said plug end to engage said inner end of said inner screw chamber to predetermine the retract stroke of said actuator device.

10. A method of operating an improved ball nut linear actuator device with multiple telescopic screws having a rotatable outer screw and a first nut defining a first helical raceway between them in which a load bearing first recirculating train of balls is received, said outer screw having a tubular portion with an axially open outer end defining an inner screw chamber having an axially inner end wall and an interior wall; a second nut fixed on said outer screw; an inner screw providing with said second nut a second raceway of opposite hand received within said outer screw tubular portion and projectible from said open outer end, the second raceway including a generally radial nut passageway communicating with said inner screw and having a load bearing second recirculating train of balls, and a non-helically grooved plug defining a non-inclined surface with an axis of rotation of the inner screw and coacting with said interior wall of said inner screw chamber, comprises the steps of:

a. rapidly rotating said outer screw causing said first nut to move said outer screw axially, and thereby said second nut and said inner screw axially;

b. simultaneously moving said inner screw axially to cause said inner screw to extend outwardly from said outer screw;

c. engaging said plug with said interior wall of said chamber sufficiently to prevent whipping of said extended inner screw at high speeds of rotation of said outer screw; and d. limiting the projection of said inner screw by positioning said non-inclined surface of said plug axially to block said radial passageway of said second recirculating raceway after a predetermined projecting movement of said inner screw in the axial direction.

11. The method of claim 10 comprising engaging said inner end wall of said inner screw chamber with said plug to predetermine the retract stroke of said actuator device.

12. A ball nut linear actuator with multiple telescoping screws having a rotatable outer screw and first nut defining a first helical raceway between them in which a load bearing recirculating first train of balls is received, said outer screw having a tubular portion with an axially open outer end on which a second nut is fixed; said tubular portion defining an inner chamber with an axially inner end and a chamber surrounding wall; a rotationally restrained inner screw, providing with said second nut a second helical raceway of opposite hand with respect to said first raceway, received within said outer screw tubular portion and projectable from said open outer end thereof, said inner screw having an axially inner end; and the second raceway including a generally radial ball passage in said second nut communicating with said inner screw, and having a load bearing second recirculating train of balls, includes the improvement wherein;

a. a non-helically grooved, plug end having an exterior wall fitting said chamber surrounding wall of the tubular portion of said outer screw is provided on said axially inner end of said inner screw and coacts with said chamber surrounding wall of said tubular portion of said outer screw to restrain whipping when said outer and inner screws are rapidly rotated;

b. said inner screw has a helical groove bounded by a helical land, said plug end being a vibration absorbing, synthetic plastic part defining a non-inclined surface with an axis of rotation of the inner screw which projects beyond said land of the inner screw; and c. said inner screw and said second nut are positioned relatively axially so that movement of said inner screw axially is halted when said non-inclined surface of said plug end comes into alignment with and blocks travel of said second train of balls in said second helical raceway.

13. The invention of claim 12 wherein said tubular portion of the outer screw has an inner end and said plug end in a second position bottoms on the inner end of the tubular portion of the first screw.

14. A ball nut linear actuator with multiple telescoping screws having a rotatable outer screw and a first nut defining a first helical raceway between them in which a load bearing recirculating first train of balls is received, said outer screw having a tubular portion with an axially open outer end on which a second nut is fixed; said tubular portion defining an inner chamber with an axially inner end and a chamber surrounding wall; a rotationally restrained inner screw, providing with said second nut a second helical raceway of opposite hand with respect to said first raceway, received within said outer screw tubular portion and projectable from said open outer end thereof and said second raceway including a generally radial ball passage in said second nut communicating with said inner screw, and having a load bearing second recirculating train of balls, includes the improvement wherein;

a. a non-helically grooved, inner screw part having an exterior wall fitting the chamber surrounding wall of said tubular portion of said outer screw is provided on said inner screw and coacts with said chamber surrounding wall of said tubular portion of said outer screw to restrain whipping when said outer and said inner screws are rapidly rotated;

b. said inner screw part defining a non-inclined surface with an axis of rotation of said inner screw for engaging and blocking said second train of balls from traveling along said second raceway passage; and c. said inner screw part in one position relative to said second hut establishing a limit of projection of said inner screw out of said outer screw by reaching an axial projection radially opposite said second raceway passage and blocking the travel of said second train of balls in said second raceway passage.

15. The improvement of claim 14 wherein said inner screw has a helical groove bounded by a helical land and said inner screw part is a vibration absorbing, non-tubular synthetic plastic part of slightly greater diameter than said land of said inner screw.

* * * * *